UNITED STATES PATENT OFFICE.

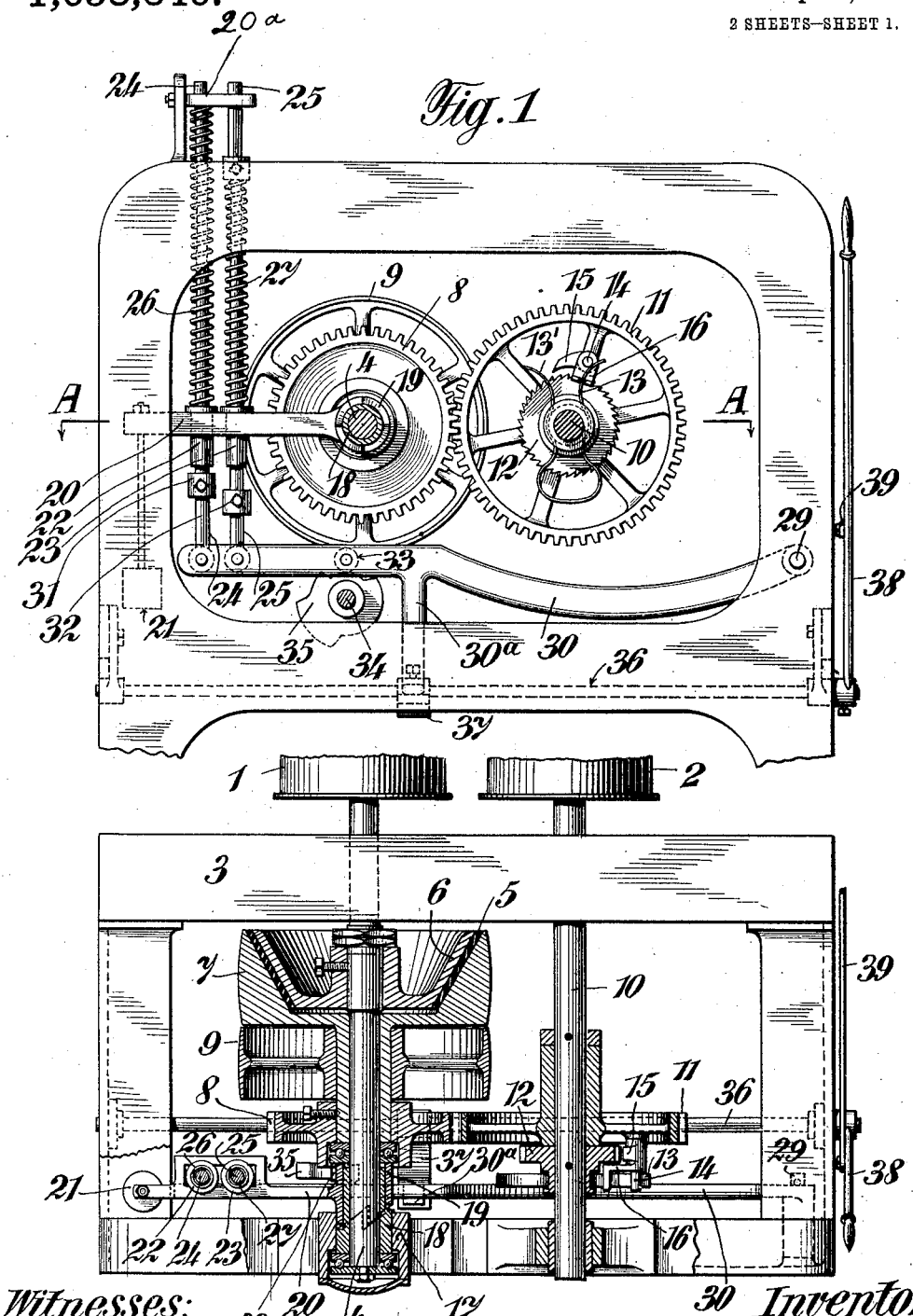

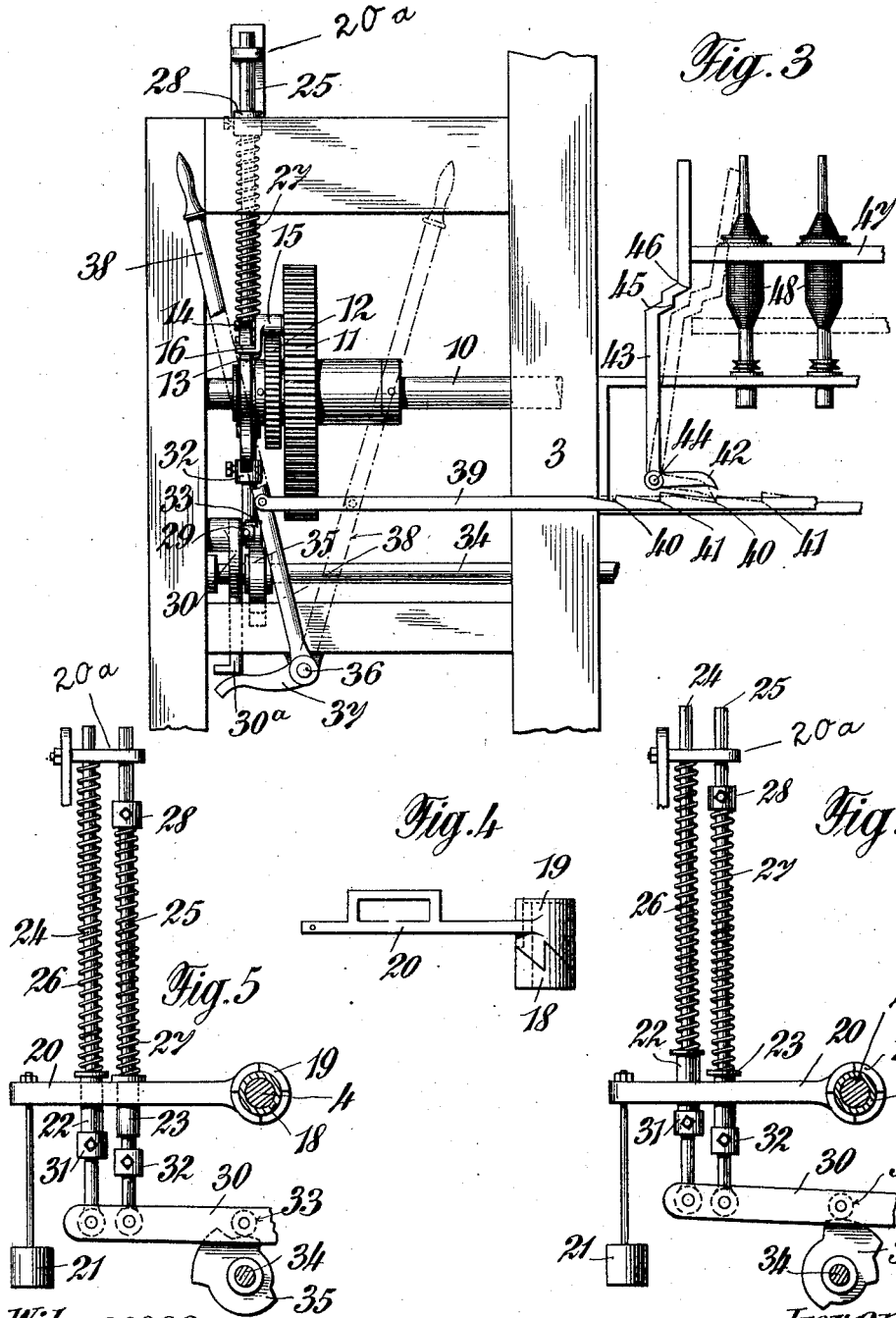

JOHANNES SOMMERHALDER, OF BOZEN, AUSTRIA-HUNGARY.

RING SPINNING AND TWISTING MACHINE.

1,058,340. Specification of Letters Patent. Patented Apr. 8, 1913.

Application filed December 30, 1910. Serial No. 600,072.

*To all whom it may concern:*

Be it known that I, JOHANNES SOMMERHALDER, a citizen of the Republic of Switzerland, residing at Bozen, Tyrol, Austria-Hungary, have invented new and useful Improvements in Ring Spinning and Twisting Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to ring spinning machines and has for its object to vary the speed of rotation of the spindles during the formation of a layer of thread on the spool.

The invention consists in providing a friction clutch which is inserted within the means for transmitting power to the spindles, and the pressure the members of said friction clutch exert on each other is automatically varied by means connected to the ring rail. In ring spinning machines with two drums, the driving pulley may be connected to the shaft of the second drum by means of a gear drive and a coupling which is so constructed as to establish the connection of the parts as soon as the coupling pressure falls below that necessary for obtaining a predetermined minimum velocity of the spindles.

Another feature of this invention is to provide means for establishing the minimum pressure of the coupling members when forming the beginning of the spool and for gradually increasing the coupling pressure as the spool is growing.

In the accompanying drawing an apparatus is shown embodying the improvements forming the invention.

Figure 1 is a front end view of the apparatus, Fig. 2 is a horizontal section on line A—A of Fig. 1, Fig. 3 is a lateral view, Fig. 4 is a detail, and Figs. 5 and 6 show parts of the apparatus in different positions.

1 and 2 designate the drums of the ring spinning machine which are rotatable in the frame and are operatively connected with each other by well known means, (not shown) for instance by the spindle driving bands, or by these bands in connection with a belt or rope drive on the ends of the drums. To the shaft 4 of drum 1 is attached a conical part 6 covered with a layer 5 of leather. A pulley 7 formed with an extended hub is free to turn on shaft 4 and has a conical recess corresponding to the part 6. These parts act as a friction clutch which may be connected and disconnected by displacing pulley 7 on shaft 4. A toothed wheel 8 is attached to the hub of the pulley 7 and between the latter and wheel 8 a pulley 9 is loosely carried on the hub of pulley 7. The wheel 8 meshes with a wheel 11 which is free to turn on the shaft 10 of drum 2. A ratchet wheel 12 is fixed on the shaft 10 beside wheel 11 and on the nave of wheel 12 is clamped a spring clamp 13, 13′. The pawl 15 for the ratchet wheel 12 is carried on a pin 14 fixed to the wheel 11. This pawl is made in one with an arm 16 which has a slot to receive one end of clamps 13, 13′. Parts 11 to 16 serve to connect pulley 7 with shaft 4 without using the cone 6.

The end of shaft 4 is journaled in a bearing 17 in the frame of the machine and is held against longitudinal movement. The bearing 17 has a sleeve 18 placed over shaft 4 (Fig. 2) and on said shaft between the sleeve 18 and the end of the hub of pulley 7 is a second sleeve 19 which has an arm 20. Both sleeves have teeth forming a claw coupling by means of which they can be brought into engagement. The teeth are so made that the arm 20 can only be moved downward out of the position shown in Fig. 1, and that only after the pulley 7 has been moved toward the cone 6, as there is no play between sleeve 19 and the hub of pulley 7. The end of lever 20 carries a weight 21. The arm is partly formed as a frame in which are sleeves 22, 23 which slide along rods 24, 25. The upper ends of rods 24, 25 are free to slide in a guide 20ᵃ of the machine frame. Springs 26 and 27 are placed over the rods 24, 25 respectively. Both springs abut at their lower ends against the respective sleeve 22, 23. At its upper end, spring 26 abuts against guide 20ᵃ, and spring 27 against a head 28 on rod 25. Both rods are linked to the end of a lever 30 adapted to turn on a pivot 29 of the machine frame.

31 and 32 are check rings carried on the rods 24, 25.

The lever 30 is raised by means of a roller 33 supported on a cam disk 35 fixed on a shaft 34. The lever has a downwardly extending arm 30ª which is engaged by a lever 37 fixed on a shaft 36 (Fig. 3). The shaft has a handle 38 to which is linked a sliding rod 39 guided in the frame of the machine and having teeth 40 and 41, the latter being somewhat higher than the former. A pawl 42 is adapted to engage the teeth 40 and 41. This pawl is fixed to a shaft 44 on which is also fixed a lever 43 having two kinks 45 and 46. When handle 38 is so displaced that pawl 42 can engage tooth 40, these kinks project over the shown end of the ring rail 47 as long as the ring rail is moving only for the purpose of guiding the thread for making the lower part of the spool. 48 are spools which are being wound.

The parts of the apparatus are shown in Figs. 1 to 3 in that position in which they are during the formation of the central and largest part of the spools. The operation during this part of the spinning process and until the spools are completed is as follows: The cam disk 35 makes one revolution during each stroke of the ring rail 47 when forming one layer of thread. The weight of the lever 30 together with that of the parts connected to it overcomes the tension of spring 27, so that the lever unless lifted by positive action, is carried on cam 35 by its roller 33. When the cam disk rotates the lever 30 is lifted from the position shown in Fig. 1, in which the pressure exerted by springs 26 and 27 and weight 21 coöperate to exert a pressure for coupling parts 6 and 7, so that the rings 31 and 32 move sleeves 22 and 23 into the positions shown in Fig. 5 in which arm 20 is free from the pressure of spring 26 and the coupling pressure is reduced by the amount of the pressure of this spring. Then the arm 30 is raised again so that sleeves 22 and 23 get into the positions shown in Fig. 6 in which arm 20 is free from both springs 26 and 27 and the coupling pressure is reduced for the amount of the pressure of these springs, only weight 21 acting on lever 20. Then the lever 30 falls back into the position of Fig. 5 and finally into that of Fig. 1 the coupling pressure being increased as it had been diminished before. The position of cam disk 35 is such that the greatest coupling pressure occurs during the lower part of the stroke of the ring rail, and a medium pressure during the medium part of the said stroke. By the maximum value of the coupling pressure the pulley 7 is rigidly coupled with the cone 6 and the drum 1 respectively, and consequently the spindles have their maximum speed during the lower part of the stroke of the ring rail or during the formation of the outer part of a layer of thread. When the coupling pressure is decreasing part 6 may slip in the pulley 7, so that part 6 is delayed with relation to pulley 7 at the same ratio as the coupling pressure decreases. In forming the interior part of a layer of thread the speed of the spindle will be smaller than in forming the central part of the layer, and the speed during this time will be less than when the exterior part of a layer is being formed. As the speed of the spindles varies with the diameter of the spool, breakings of threads and their consequences are avoided.

In order to guarantee that the speed of the spindles does not only attain its predetermined upper limit but also its lower limit, and does not exceed these limits, the pawl and ratchet device 11, 12, 13, 14, 15, 16 is provided. The ratio is such that when arm 20 is free from the pressure of springs 26, 27 (Fig. 6) the coupling pressure falls below the value necessary for obtaining the smallest circumferential velocity of the spindles. The ratio of wheels 8 and 11 is such that wheel 11 rotates with that velocity which corresponds to the lowest speed of the spindles, consideration being had of the ratio of shaft 10 to these spindles. Both the toothed wheel 11 and the ratchet wheel 12 rotate in the same direction and the speed of the toothed wheel is constant while the speed of shaft 10 and of the ratchet wheel connected to it varies according to the pressure of the friction clutch. During the time the speed of the drums 1 and 2 has not attained the admissible minimum the ratchet wheel 12 moves faster than the toothed wheel 11. The ratchet wheel has the tendency of carrying clamps 13, 13' with it, which causes part 13 to be pressed against arm 16 in the direction of rotation and the pawl 15 to be maintained out of engagement in the position shown in Fig. 1 until the end of part 13 touches the pin 14. The ratchet wheel 12 slides between the arms 13, 13'. When arm 20 is free from springs 26 and 27 the speed of drums 1 and 2 has a tendency to fall below the admissible value. The toothed wheel 11 which carries the pin 14 has a tendency to rotate faster than ratchet wheel 12 and part 13. The end of part 13 moves away from pin 14 thereby causing pawl 15 to engage the teeth of the ratchet wheel which is forced to rotate with wheel 11. This causes drum 1 to be actuated from pulley 7 over wheels 8, 11 and 12, shaft 10 and drum 2.

When forming the beginning of a spool the apparatus operates as follows: Before the formation begins lever 38 has been pushed backward into the dot and dash lines position of Fig. 3 which causes lever 43 and pawl 42 to be moved into the corresponding dot and dash lines position. Arm 37 raises lever 30 so that cam 35 can no longer act on it so that for the time being the speed of the spindles does not vary during one stroke of the ring rail but keeps at its minimum value. While the formation of the spool proceeds the traverse of the rail ring also rises, which pushes back lever 43, raises the point of pawl 42 out of engagement with tooth 40 and releases rod 39. Lever 30 is lowered by its own weight which causes rod 39 to move forward until tooth 41 is in contact with the point of pawl 42. Lever 30 can then not be lowered farther. The lowering of said lever which has occurred is sufficient to allow cam disk 35 to partly act on lever 30 so that during the formation of one layer of thread for the medium part of the beginning of the spool alternately weight 21 alone and weight 21 together with the pressure of spring 27 act on arm 20. After forming the medium part of the beginning of the spool the traverse of the ring rail has risen again and pawl 42 is out of engagement with rod 39 owing to the ring rail getting into contact with kink 46 of lever 43. The pawl and ratchet device consisting of parts 36 to 46 is then in the position shown in full lines in Fig. 3 and the operation of the apparatus is as described. In forming the beginning of the spool not all the possible speeds of the spool occur from the beginning but the higher speeds are added by slow degrees as the spool is growing.

In the example shown and described there is only a maximum speed, a minimum speed and a medium speed of the spindles. Cam 35 may, however, be so made that two or more medium speeds of the spindles are attained.

The frictional conditions between the leather covering 6 of cone 5 and pulley 7 are preferably such that when arm 20 is free from the pressure of springs 26 and 27, that is, when the spindles are rotating at their minimum speed, three quarters of the power transmitted to the pulley are taken up by cone 5 and one quarter is taken up by shaft 10 through the medium of wheel 11 and ratchet wheel 12. This ratio can be regulated by increasing or decreasing weight 21. By adjusting ring 28 the coupling pressure for the maximum speed of the spindles as well as that for their medium speed may be varied.

In the apparatus described the variations in the speed of the spindles will always take place without jerks so that breakings of threads are not to be feared and the machine works without noise.

The apparatus can be adapted to ring spinning machines having constant speed of the spindles with less constructional alterations, less expense and simpler means than electrically controlled apparatus serving the same purpose.

Having now particularly described and ascertained the nature of the said invention and in what manner the same is to be performed, I declare that what I claim is:

1. In ring spinning machines, spindles, means for transmitting power to said spindles, a friction clutch inserted within said means, a ring rail, and means connected to the latter for automatically varying the pressure which the members of said friction clutch exert on each other.

2. In ring spinning machines, spindles, means for transmitting power to said spindles, a friction clutch inserted within said means, a ring rail, and means connected to the latter for automatically varying the pressure the members of said friction clutch exert on each other so that the pressure is increased and decreased with the diameter of the spool.

3. In ring spinning machines, spindles, means for transmitting power to said spindles including a friction clutch, means for varying the pressure between the members of said friction clutch, and positive impelling means coöperating with said means for transmitting power.

4. In a ring spinning machine, spindles, power transmitting means for the spindles, a friction clutch, mechanism for varying the pressure between the members of said clutch, positive impelling means in coöperative relation to the power transmitting means, and mechanism to render the impelling means effective when the pressure of the clutch members falls below a predetermined minimum.

5. In ring spinning machines, spindles, means for transmitting power to said spindles including a friction clutch, means for varying the pressure between the members of said friction clutch, positive impelling means coöperating with said means for transmitting power, means for keeping the members of the clutch in that position in which they exert the minimum pressure on each other.

6. In ring spinning machines, spindles, a ring rail, means for transmitting power to said spindles including a friction clutch, means for varying the pressure between the members of said friction clutch, positive impelling means coöperating with said means for transmitting power, means for keeping the members of the clutch in that position in which they exert the minimum pressure on each other, and means coöperating with the ring rail for gradually increasing the pressure between the members of the clutch.

7. In ring spinning machines, spindles, means for transmitting power to said spindles including a friction clutch, a ring rail, a claw coupling adapted to axially move one member of the friction clutch, a lever connected to one member of the claw coupling, springs adapted to press on the lever, and a cam disk performing one revolution during each stroke of the ring rail and acting on the springs to vary their pressure on said lever.

8. In ring spinning machines, spindles, means for transmitting power to said spindles including a friction clutch, a ring rail, a claw coupling adapted to axially move one member of the friction clutch, a lever connected to one member of the claw coupling, springs adapted to press on the lever, a cam disk performing one revolution during each stroke of the ring rail and acting on the springs to vary their pressure on said lever, and hand-controlled means for preventing the springs from being acted on by the cam disk and from pressing on the lever.

9. In ring spinning machines, spindles, means for transmitting power to said spindles including a friction clutch, a ring rail, a claw coupling adapted to axially move one member of the friction clutch, a lever connected to one member of the claw coupling, springs adapted to press on the lever, a cam disk performing one revolution during each stroke of the ring rail and acting on the springs to vary their pressure on said lever, hand controlled means for preventing the springs from being acted on by the cam disk and from pressing on the lever, and means coöperating with the ring rail for gradually releasing the action of said hand controlled means.

In testimony that I claim the foregoing as my invention, I have signed my name in presence of two subscribing witnesses.

JOHANNES SOMMERHALDER.

Witnesses:
ERNST FISCHER,
ARTHUR J. BUNDY.

Copies of this patent may be obtained for five cents each, by addressing the "Commissioner of Patents, Washington, D. C."